United States Patent
Govindaraju et al.

[19]

[11] Patent Number: 6,112,222

[45] Date of Patent: *Aug. 29, 2000

[54] METHOD FOR RESOURCE LOCK/UNLOCK CAPABILITY IN MULTITHREADED COMPUTER ENVIRONMENT

[75] Inventors: Rama K. Govindaraju; Elizabeth Anne Kon; Robert Michael Straub, all of Poughkeepsie; William G. Tuel, Jr., Kingston, all of N.Y.

[73] Assignee: International Business Machines Corporation, Armonk, N.Y.

[ * ] Notice: This patent is subject to a terminal disclaimer.

[21] Appl. No.: 09/139,816

[22] Filed: Aug. 25, 1998

[51] Int. Cl.$^7$ .................................................. G06F 9/00

[52] U.S. Cl. .................................. 709/102; 709/104

[58] Field of Search ..................... 709/100, 102, 709/103, 105, 108, 300, 101, 104

[56] References Cited

U.S. PATENT DOCUMENTS

| | | | |
|---|---|---|---|
| 4,604,694 | 8/1986 | Hough | 364/200 |
| 5,012,409 | 4/1991 | Fletcher et al. | 364/200 |
| 5,285,528 | 2/1994 | Hart | 395/725 |
| 5,421,014 | 5/1995 | Bucher | 395/650 |
| 5,442,758 | 8/1995 | Slingwine et al. | 395/375 |
| 5,450,592 | 9/1995 | McLeod | 709/104 |
| 5,452,459 | 9/1995 | Drury et al. | 395/700 |
| 5,481,706 | 1/1996 | Peek | 395/650 |
| 5,511,192 | 4/1996 | Shirakihara | 395/650 |
| 5,590,326 | 12/1996 | Manabe | 711/150 |
| 5,608,893 | 3/1997 | Slingwine et al. | 395/468 |
| 5,630,136 | 5/1997 | Davidson et al. | 709/106 |
| 5,669,500 | 9/1997 | Sutherland | 206/427 |
| 5,946,711 | 8/1999 | Donnelly | 711/152 |

FOREIGN PATENT DOCUMENTS

| | | |
|---|---|---|
| 114186 | 8/1984 | Japan . |
| 60-193143 | 10/1985 | Japan . |
| 4157556 | 5/1992 | Japan . |
| 785547 | 7/1997 | Japan . |

OTHER PUBLICATIONS

Performance Characteristic of Protocols With Ordered Shared Locks, D. Agrawal, A. El Abbadi, A.E. Lang, Department of Computer Science, University of California, Santa Barbara, Ca 93106, ICDE, Apr. 1991.

IBM Publication: D. Blakely–Fogel, "Porting Applications to the AIX 4.1 OS SMP environment", pp. 28–29 (Nov., 1994).

K.A. Robbins and S. Robbins, "Practical UNIX Programming: A Guide to Concurrency, Communication, and Multithreading", p. 10, pp. 333–334, 347–349 & 365–369, (1996).

IBM Publication: "AIX Technical Reference, vol. 2: Base Operating System & Extensions", Version 4, 4th edition, pp. 1–1065–1–1072 & p. 1–1092 (Oct., 1996).

(List continued on next page.)

*Primary Examiner*—Majid Banankhah
*Attorney, Agent, or Firm*—Floyd A. Gonzalez, Esq.; Heslin & Rothenberg, P.C.

[57] ABSTRACT

Hybrid lock and unlock capabilities are provided for a threaded computing environment. For example, kernel locking services are selectively employed in conjunction with functions in the POSIX threads standard to provide a lock capability and an unlock capability. The hybrid approach determines which lock scheme to employ by evaluating whether one thread or multiple threads concurrently desire a resource lock. When only one thread desires the lock, the thread is directly assigned resource ownership employing one of an operating system primitive lock process or a hardware lock process. An alternate lock process is used to obtain resource ownership when multiple threads concurrently desire the lock. This alternate process employs at least one function in the POSIX threads standard to implement a queue of waiting threads. A similar hybrid approach to the unlock capability is also provided.

17 Claims, 4 Drawing Sheets

OTHER PUBLICATIONS

IBM Publication: "IBM Parallel Environment for AIX: MPI Programming and Subroutine Reference", Version 2, Release 2, 2nd edition, pp. 319–325 (Nov., 1996).

W. Richard Stevens, "UNIX network Programming", Health Systems International, pp.326–328 & pp. 333–334 (1990).

M. Snir et al., "The communication software and parallel environment of the IBM SP2", IBM Systems Journal, vol. 34, No. 2, pp. 205–215, (1995).

IBM Publication: "IBM Parallel Environment for AIX: MPI Programming and Subroutine Reference", Version 2, Release 3, 3rd edition, pp. 151 & 152; pp. 179 & 180 (Aug. 25, 1997).

IBM Publication: "AIX Technical Reference, vol. 1: Base Operating System & Extensions", Version 4, 4th edition, pp. 1–840–1–842; pp. 1–850 & 1–851; pp. 1–875 & 1–876; & p. 1–879 (Oct. 1996).

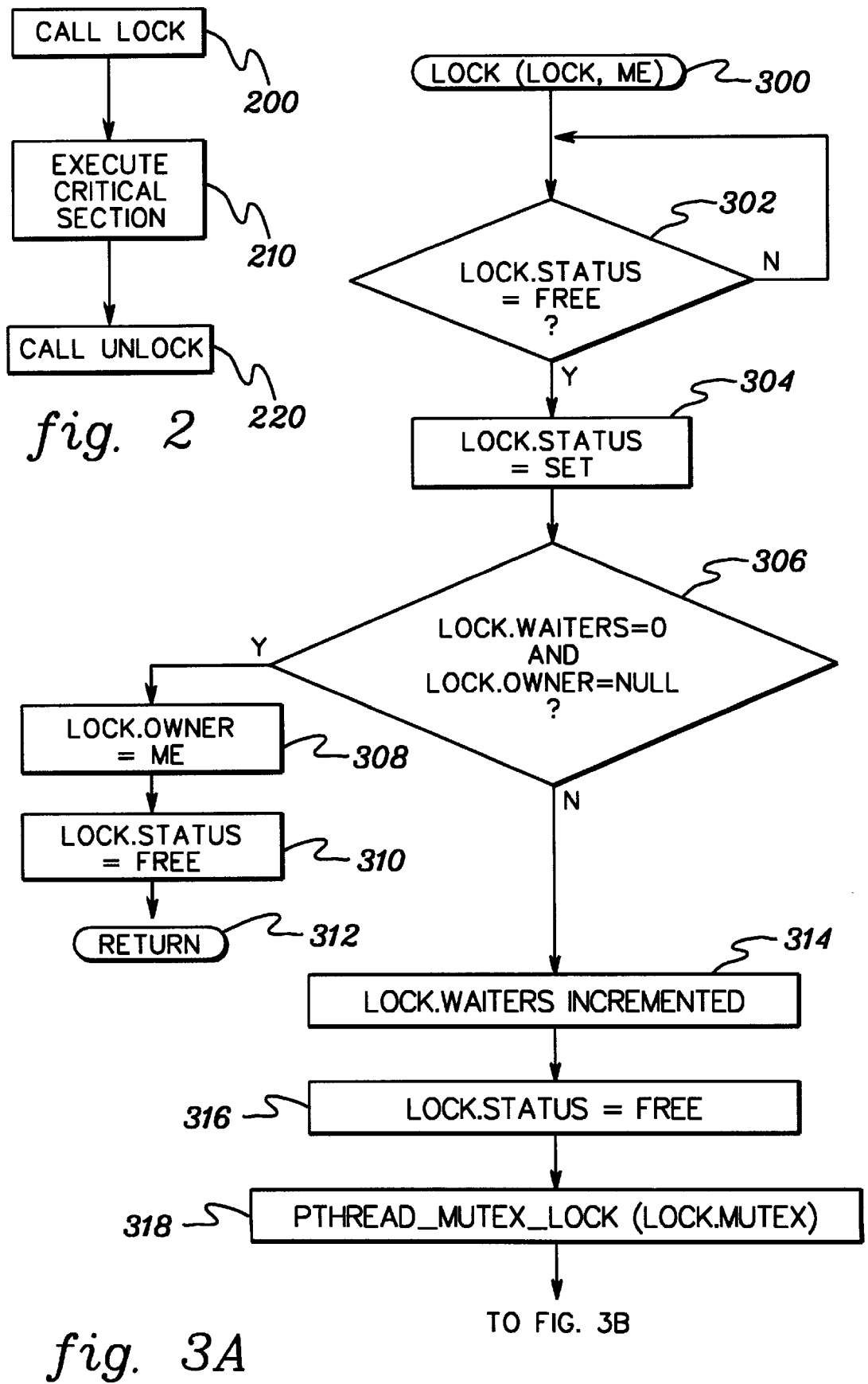

METHOD FOR RESOURCE LOCK/UNLOCK CAPABILITY IN MULTITHREADED COMPUTER ENVIRONMENT

CROSS-REFERENCE TO RELATED APPLICATIONS

This application contains subject matter which is related to the subject matter of the following applications, each of which is assigned to the same assignee as this application and filed on the same day as this application. Each of the below-listed applications is hereby incorporated herein by reference in its entirety:

"SYSTEM FOR RESOURCE LOCK/UNLOCK CAPABILITY IN MULTITHREADED COMPUTER ENVIRONMENT," by Govindaraju et al., Ser. No. 09/139,255, (Docket No. PO9-98-178); and "RESOURCE LOCK/UNLOCK CAPABILITY IN MULTITHREADED COMPUTER ENVIRONMENT," by Govindaraju et al., Ser. No. 09/138,996, (Docket No. PO9-98-179).

TECHNICAL FIELD

This invention relates to capabilities for managing shared resources in a computer system, and, more particularly, to shared resource management techniques in multithread environments.

BACKGROUND OF THE INVENTION

In order to better understand the background of the subject invention, explanation of certain terminology is first provided. A term well-known in the art as a symmetric multi-processor (SMP) refers to an aspect of hardware in a computing system and, more particularly, relates to the physical layout and design of the processor planar itself. Such multiple processor units have, as one characteristic, the sharing of global memory as well as equal access to I/O of the SMP system.

Another term which is commonly associated with modern complex computing systems is a "thread". The term "thread" in a general sense refers merely to a simple execution path through application software and the kernel of an operating system executing with the computer. As is well understood in the art, it is commonplace for multiple such threads to be allowed per a single process image.

A thread standard has now been incorporated into the POSIX standard. Basic thread management under the POSIX standard is described, for example, in a publication by K. Robbins and S. Robbins entitled *Practical UNIX Programming—A Guide To Concurrency, Communication and Multi-threading,* Prentice Hall PTR (1996).

Another concept which is utilized hereinafter in describing the invention is one of "locks" or "mutexes". It is typical in modern computing systems to have critical sections of code or shared data structures, such as shared libraries, whose integrity is extremely important to the correct operation of the system. Locks/mutexes are, in general, devices employed in software (or hardware) to "serialize" access to these critical sections of code and/or shared data structures.

Two types of locks are often encountered in the art, namely blocking locks and simple or "spin" locks. Blocking locks are of the form which cause a thread requesting the lock to cease being executable, e.g., to go to "sleep" as the term is employed in the art, if the lock is currently held by another thread. Spin locks, in contrast, do not put waiting threads to "sleep", but rather, the waiting threads execute a spin loop, and thus repeatedly continue to request the lock until it is freed by the current thread "owner". Blocking locks are typically used for large critical sections of code or if the operating system kernel must differentiate between threads requiring data structure read-only capability and threads requiring the capability to modify the data structure(s).

One other term to note is the concept of code being multithread-safe. Code is considered to be thread/MP-safe if multiple execution threads contending for the same resource or routine are serialized such that data integrity is insured for all threads. One way of effecting this is by means of the aforementioned locks.

By way of further background, one approach to shared and exclusive access control in a multiprocessor system is presented in U.S. Pat. No. 4,604,694, entitled "Shared and Exclusive Access Control". Briefly described, this patent employs a lockword to control access to a queue of the resource desired and indicates both the present use of the resource and a pointer to the most recently enqueued task in the queue. Methods using an atomic, double compare and swap operation allow a task requesting either exclusive or shared access of the resource to be enqueued, and allow tasks requiring either exclusive or shared access to the resource to suitably rearrange the queue and prepare access to the resource for other tasks. The approach is hardware dependent in that the method relies on the atomic double compare and swap operation of, for example, an IBM System/370 product. Unfortunately, many of today's multiprocessing systems, such as an RS/6000 system offered by International Business Machines Corporation, lack this particular instruction capability.

Presently, thread locking employs standard POSIX mutex functions. These standard POSIX functions include pthread_mutex_lock and pthread_mutex_unlock which are described, for example, in the above-referenced publication by K. Robbins & S. Robbins entitled *Practical UNIX Programming—A Guide to Concurrency, Communication and Multi-threading.* These functions are designed to enhance portability of applications running on several operating systems. Unfortunately, the functions have the disadvantage of poor performance and are often inefficient for high performance libraries, such as a threaded message passing interface (MPI) library, particularly, since uncontested performance is the most important marketing and evaluation criterion.

Thus, a need exists in the art for a commercially enhanced approach to multithread-safe resource locking and unlocking in a multithread computer environment.

DISCLOSURE OF THE INVENTION

Briefly summarized, the invention comprises in one aspect a method for obtaining a lock on a resource in a multithread computer environment. The method includes: determining whether one thread or multiple threads desire the resource lock; directly assigning resource ownership to the one thread when the determining determines that only the one thread is actively seeking a lock on the resource, the directly assigning employing a first lock process which comprises one of an operating system primitive lock process or a hardware lock process; and, employing a second lock process to obtain the lock on the resource when the determining determines that multiple threads concurrently desire ownership of the resource, the second lock process employing at least one function in the POSIX threads standard.

In another aspect, a method for unlocking a lock on a resource in a multithread computer environment is provided.

The lock employs a lock structure including a lock.owner field representative of thread ownership of the resource, a lock.status field representative of ownership of the lock structure, and a lock.waiters field representative of a count of threads waiting to obtain the lock. The method includes: obtaining control of the lock structure by setting the lock-.status field; determining whether any threads are waiting for the lock by evaluating the lock.waiters field; and if no threads are waiting, directly setting the lock.owner field to null, otherwise employing at least one function in the POSIX threads standard to set the lock.owner field to null and issue a thread condition signal to waiting threads that the resource has been unlocked.

To restate, a hybrid lock function (and/or macro) is presented herein which has minimal impact on performance when only a single thread is active, but which provides correct operation using mutex locks when multiple threads are active. When lock is to be acquired, the lock state is tested via AIX-provided atomic test functions. If the lock is unowned and if there are no waiters, the lock is claimed by the thread and ownership set via AIX-provided atomic functions. These have minimal overhead, and correspond to the case in which only one thread is trying to acquire the lock. However, if the lock is owned and/or there are already threads waiting to acquire the lock, the thread updates the wait count and does a POSIX thread condition wait, thus putting itself to sleep awaiting an unlock signal. When the current lock is released, a similar set of tests is performed by the releasor. If there are no waiters, the global ownership variable is atomically reset; otherwise, a POSIX thread signal is sent to awaken a waiting thread. A similar hybrid approach to the unlock function is also presented herein.

BRIEF DESCRIPTION OF THE DRAWINGS

The above-described objects, advantages and features of the present invention, as well as others, will be more readily understood from the following detailed description of certain preferred embodiments of the invention, when considered in conjunction with the accompanying drawings in which:

FIG. 2 is a simplified flowchart of a resource lock, execute and unlock process;

FIGS. 3a & 3b depict one embodiment of a hybrid lock process in accordance with the present invention.

BEST MODE FOR CARRYING OUT THE INVENTION

In accordance with the principles of the present invention, a hybrid lock scheme is presented for a threaded computing environment wherein kernel locking services are selectively employed in conjunction with functions in the POSIX threads standard. This hybrid scheme provides enhanced performance where there is no contention for a resource lock, which is typically the case.

Figure 1:
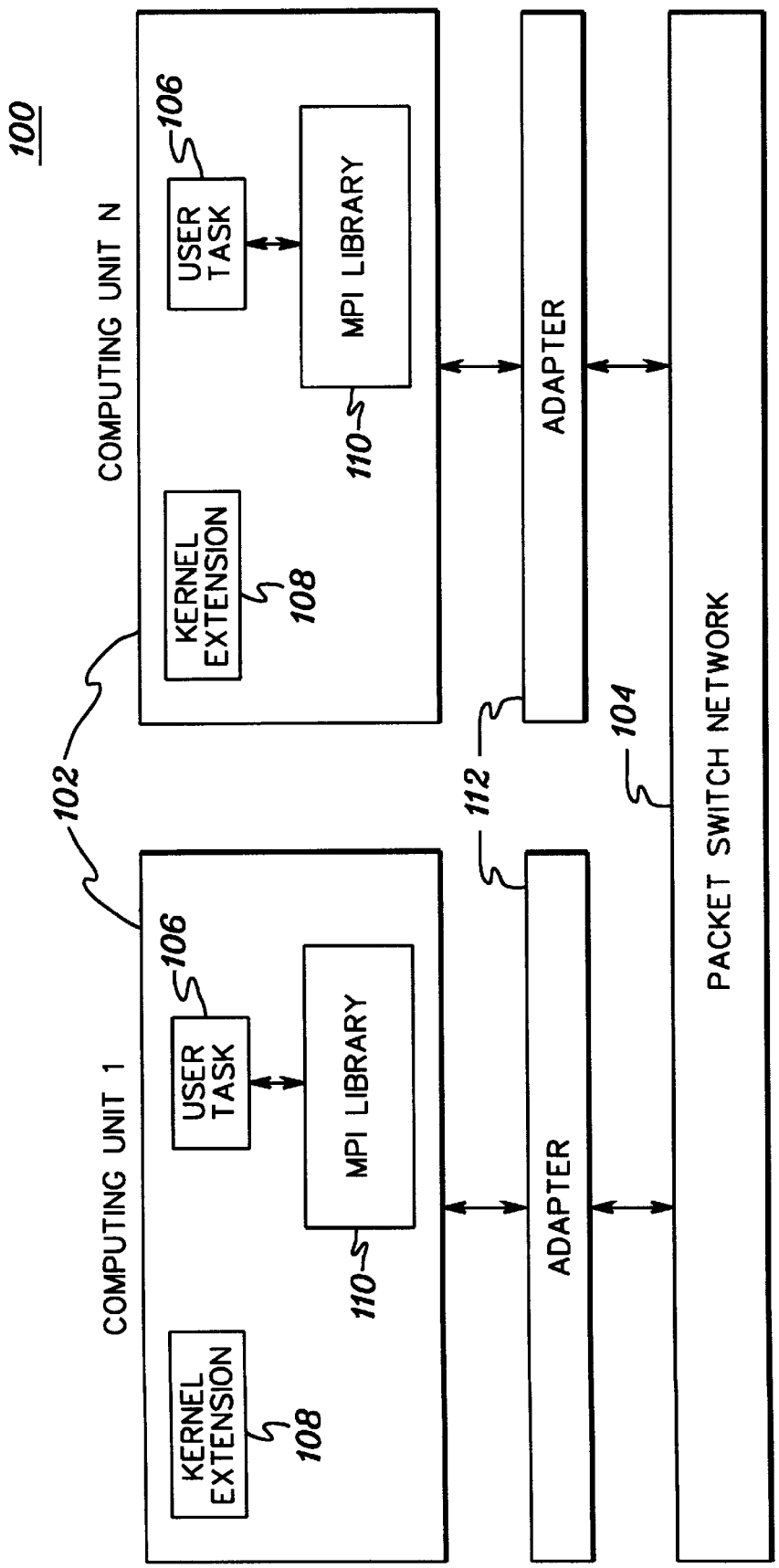
FIG. 1 depicts one example of a threaded computer environment incorporating resource locking capabilities in accordance with the present invention.

One example of a threaded computer environment incorporating and using the hybrid lock and unlock capabilities of the present invention is described below with reference to FIG. 1.

As shown, a computer environment 100 includes a plurality of computing nodes 102 coupled to one another via a connection 104. As one example, each computing node may comprise a node of an RS/6000 SP System offered by International Business Machines Corporation, and connection 104 may be a packet switch network, such as the SP switch or high performance switch (HPS), also offered by International Business Machines Corporation. Note again, FIG. 1 is presented by way of example only. The techniques disclosed herein could apply to any serial program or any multithreaded program running on a single machine in addition to the multiprocessor environment depicted in FIG. 1.

Within environment 100, message packets are passed from a source computing node (sender) to a receiver computing node (receiver) via packet switch network 104. For example, a user task 106 of computing unit N may pass a message to a user task 106 of computing unit 1 (receiver). Each user task can directly read data from and write data to an associated adapter 112, bypassing the overhead normally associated with having the operating system intervene in communication protocols. Adapter 112 couples computing unit 102 to switch 104. One example of switch 104 is described in detail in "IBM Parallel System Support Programs For AIX Administration Guide," Publication No. GC23-3897-02 (1996).

As further explanation, communication between a computing unit and its associated adapter 112 is, for instance, described by an interface that includes functions, such as, open communication, close communication, enable route, disable route, return status, and reset adapter. In one embodiment, the interface comprises a message passing interface (MPI) 110, also referred to herein as an MPI library. The MPI library comprises one example of a resource for which a lock mechanism in accordance with the present invention may be employed.

Access to the adapter is mediated by a kernel extension 108 within each computing unit 102. Extension 108 includes a set of functions that have the authority of the operating system itself (e.g., the AIX operating system offered by International Business Machines Corporation). The kernel extension authorizes use of adapter 112 by user task 106 (or a program) and has the capability of interrupting the user task, if desired. User task 106 communicates with adapter 112 through the MPI library 110. The MPI library is described in greater detail in, for example, an International Business Machines Corporation publication entitled "IBM Parallel Environment For AIX: MPI Programming and Subroutine Reference," Version 2, Release 2 (November, 1996), the entirety of which is hereby incorporated herein by reference.

International Business Machines Corporation's implementation of the MPI library is described in detail in various additional publications. For example, reference an article in the IBM Systems Journal entitled "The Communication Software In Parallel Environment Of The IBM SP2," Vol. 34, No. 2, pp. 205–215 (1995). Further information is available in a textbook by W. Richard Stevens entitled *UNIX Network Programming,* published by Prentice Hall, Inc. (1990). Both of these references are hereby incorporated by reference in their entirety.

As noted, it is assumed herein that the computing environment comprises a threaded computer environment so that the user task comprises a threaded user, and the library is a threaded MPI. A threaded computer environment is today well-known in the industry as one approach to implementing multinode distributed processing. A threaded MPI library is available from International Business Machines Corporation as "IBM Parallel Environment For AIX," Version 2, Release 3, IBM Product No. 7565-543 (August 1997). This threaded MPI comprises a licensed program product which runs on the AIX system.

Figure 3B:
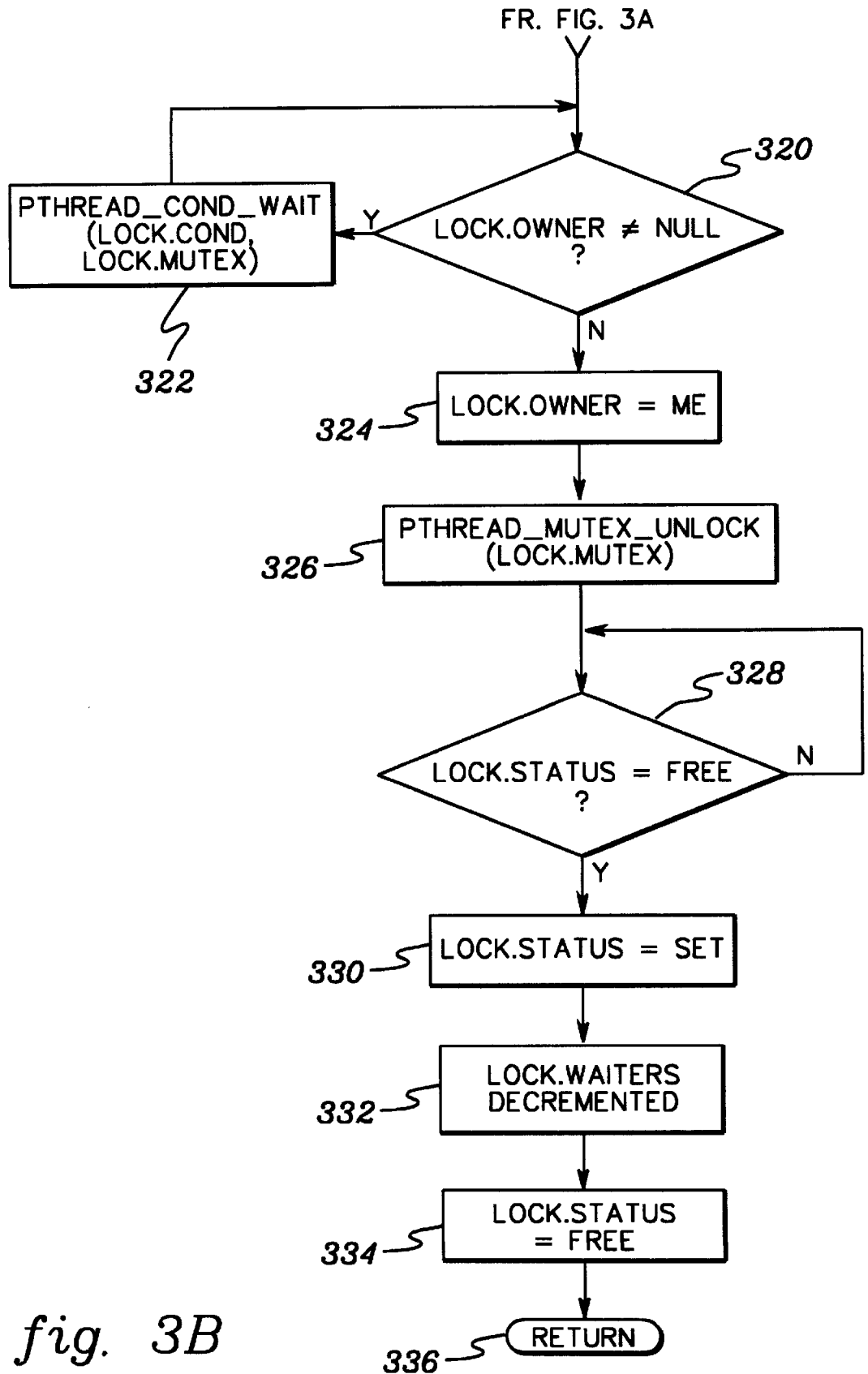
Figure 4:
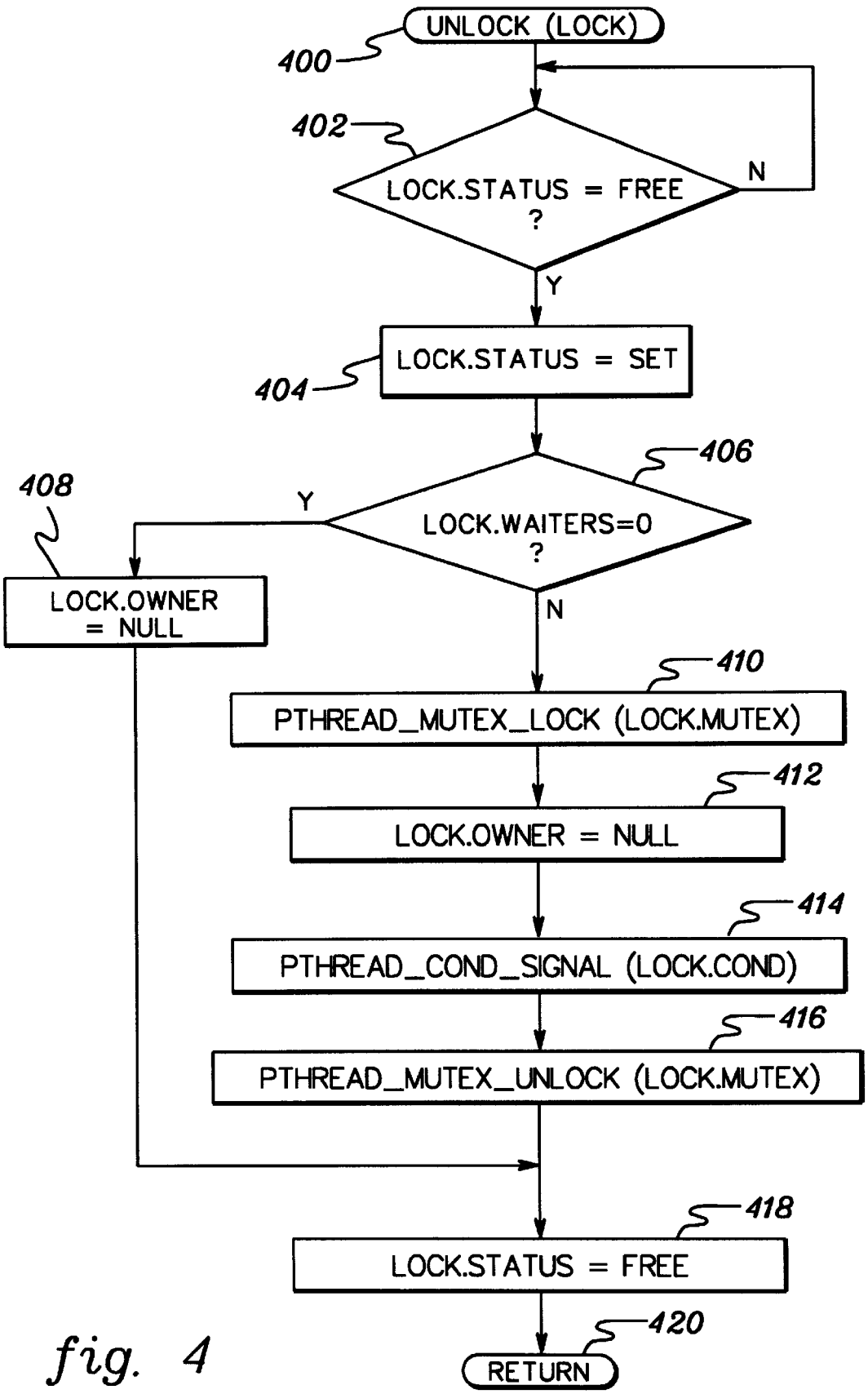
FIG. 4 is a flowchart of one embodiment of a hybrid unlock process in accordance with the present invention.

One embodiment of a combined lock process in accordance with the present invention is next described in connection with FIGS. 2–4. Beginning with FIG. 2, the lock process is invoked by a macro or a function call to lock a desired resource 200. Once the lock is obtained, the critical section is executed 210, and once completed, a call is invoked to unlock the resource 220. FIGS. 3a & 3b depict one embodiment of a hybrid lock process in accordance with the present invention, while FIG. 4 depicts one embodiment of a hybrid unlock function in accordance with the present invention.

In one embodiment of the present invention, a control or lock structure is employed which is user defined and available to all threads desiring the lock/unlock call. Additionally, a user allocates at initialization a POSIX "mutex" and "cond" structure, which is commonly addressable by all threads. When each thread starts, the relevant information (described below) is passed to the operating system in a reliable manner. In one embodiment, the lock structure comprises a listing of five words or data representing fields used in manipulation of the lock/unlock processes. Specifically, the lock structure may have the following elements or fields:

.status (free or set)
.owner (null or owner ID)
.waiter(s) (count of threads waiting on this lock)
.mutex (address of pthread mutex)
.cond (address of pthread condition).

In accordance with this invention, the lock.status field indicates whether the control structure itself is held (or "set"), or is "free". As explained further below, a lock call must first ensure possession of the lock structure before attempting to evaluate and obtain the lock condition on the resource. The lock.owner field identifies whether a thread has a lock on the resource, and if so, the owner ID, while the lock.waiter field is a count of the threads waiting for a lock on the resource.

The lock.mutex and lock.cond structures are employed by functions of the POSIX threads standard as shown in flowcharts FIGS. 3a–4. The lock.mutex field is used by a "pthread" type lock in accordance with one branch of processing pursuant to the present invention, while the lock.cond structure identifies a thread in wait condition that will ultimately receive a wake thread signal. This structure keeps track of a sleeping thread and contains an address to a structure that can be updated by the operating system kernel. There has to be a mutex associated with each lock.cond to make sure that the variable itself is updated serially, i.e., if there are multiple threads, provision must be made to ensure that the correct condition is being employed. The pthreads (or POSIX threads) referenced above and below are described, for example, in an IBM AIX publication entitled "Technical Reference, Volumes 1 & 2, Base Operating System & Extensions," Version 4, 4th Edition, (October 1996), the entirety of which is hereby incorporated herein by reference.

FIGS. 3a & 3b present one embodiment of a hybrid lock process in accordance with the present invention. A lock call 300, which references an associated lock structure ("lock"), and includes a thread ID ("me"), initially determines whether the status field of the lock structure is "free" 302. If "no", then processing waits for the status field to be free (e.g., using a short wait instruction). Once lock.status is free, the status is "set" 304, meaning that the lock structure is then owned by the calling thread. Inquiry 302 and instruction 304 essentially comprise an atomic compare & swap function which is a function provided as a direct kernel call (e.g., _check_lock) by AIX and is thus implemented with minimum overhead.

Once the lock structure is "set", processing determines whether there are any threads waiting (.waiters) for a lock on the resource and whether there is a current lock (.owner) on the resource. If both lock.waiters is 0 and lock.owner is a null, then the current lock can be directly assigned by setting lock.owner equal to "me" 308, i.e., the calling thread's ID. This transition from inquiry 306 to instruction 308 is an optimized lock path in accordance with the invention. Essentially, since only one thread desires a lock on the resource, a truncated lock approach is employed. This truncated process can comprise one of an operating system primitive lock or a hardware lock process. For example, an operating system primitive lock function may comprise the _check_lock() function to acquire the lock status, and the _clear_lock() function to release the lock status, while the hardware process may comprise a hardware compare and swap instruction or an atomic store instruction. After setting the owner field, lock.status is set "free" 310 and processing returns from the lock call 312. Freeing lock.status can again comprise an AIX provided atomic function such as the "clear_lock" function.

If there are threads waiting for a resource lock or there is currently a lock on the resource, then processing increments the lock.waiters count 314 and returns lock.status to "free" 316. This alternate lock branch builds a queue of waiters for the lock, represented by a list of threads waiting on the thread unlock condition (lock.cond). This approach employs functions in the POSIX threads standard, including a pthread_mutex_lock function, a pthread_condition_wait function and a pthread_mutex_unlock function. The pthread_mutex_lock function is a mutually exclusive lock described in greater detail in the above-incorporated materials entitled "Technical Reference, Volumes 1 & 2, Base Operating System & Extensions," Version 4, 4th Edition (October 1996). The pthread_mutex_lock function is employed using the lock.mutex field 318.

Processing next determines whether lock.owner is other than "null" 320. Assuming that there is a current owner, then the pthread_cond_wait function is implemented using the lock.cond variable address and lock.mutex address 322. Essentially, since another thread owns the lock, the current thread calling for the lock is placed in a wait state until, e.g., it receives a wakeup signal. After receiving the wakeup signal, the thread will try again to determine whether the control lock is free. Once all prior lock requests have been satisfied, then lock.owner is set to the current thread's ID ("me") 324 and the pthread_mutex is unlocked 326.

After unlocking the pthread, processing performs the "_check_lock" sequence noted above by determining whether lock.status is free 328, and once free, setting the lock.status 330 to obtain control of the lock structure. Thereafter, the lock.waiters count is decremented 332, and the lock.status is freed 334 before return is made 336. On a multi-processor system (SMP), it cannot be assumed that incrementing or decrementing a variable is atomic, hence manipulating lock.waiters in accordance with the present invention is preceded by the setting of lock.status.

One embodiment of an unlock call 400 in accordance with the present invention is depicted in FIG. 4. In this embodiment, the unlock call again provides certain "lock"

information and a thread ID ("me"). The atomic compare and swap of lock.status from "free" to "set" is initially performed via inquiry 402 and instruction 404 as discussed above. Upon setting the lock.status field, authority to work with the variables of the lock structure is granted to the unlock call. Thereafter, processing determines whether any thread is waiting on a lock 406. If "no", then the lock.owner field is updated to null 408.

However, if one or more threads is waiting on the lock, a pthread_mutex_lock is employed in order to allow communication to the other waiting threads 410. After obtaining this pthread lock, the lock.owner is set to null 412 and the pthread_cond_signal function is employed to send a lock release signal to the waiting threads 414. After sending this thread condition signal, the pthread_mutex is unlocked and the waiting thread(s) is clear to proceed 416. After unlocking 416 or setting lock.owner to null 408, the lock.status field is freed 418 and processing returns from the unlock call 420.

The embodiment described above is only an example. For instance, the above-described computer environment is presented as one embodiment only. A computing unit can include other types of units, nodes, computers, processors, systems, workstations and/or mainframes without departing from the spirit of the present invention. Additionally, each of the coupled units may be of the same type, of a different type or of any combination therebetween. Further, the computing units may be coupled to one another via various types of connections.

In the above example, each of the computing units is executing an AIX operating system offered by International Business Machines Corporation. However, this is also only one example. One or more of the computing units may execute any one of various operating systems. In yet another embodiment, the computer environment includes only one computing unit that executes multiple tasks of an application, in accordance with the principles of the present invention.

The present invention can be included in an article of manufacture (e.g., one or more computer program products) having, for instance, computer useable media. The media has embodied therein, for instance, computer readable program code means for providing and facilitating the capabilities of the present invention. The article of manufacture can be included as part of a computer system or sold separately.

The flow diagrams depicted herein are exemplary. There may be other variations to these diagrams or the steps (or operations described herein) without departing from the spirit of the invention. For instance, the steps may be performed in differing order, or steps may be added, deleted, or modified. All these variations are considered a part of the claimed invention.

Although preferred embodiments have been depicted and described in detail herein, it will be apparent to those skilled in the art that various modifications, additions, substitutions and the like can be made without departing from the spirit of the invention and these are therefore considered to be within the scope of the invention as defined in the following claims.

What is claimed is:

1. A method for obtaining a lock on a resource in a multithread computer environment, said method comprising:

determining whether one thread or multiple threads desire said lock on said resource;

directly assigning resource ownership to said one thread when said determining determines only said one thread to be actively seeking said lock on said resource, said directly assigning employing a first lock process comprising one of an operating system primitive lock process or a hardware lock process; and employing a second lock process to obtain said lock on said resource when said determining determines that multiple threads concurrently desire ownership of said resource, said second lock process employing at least one function in the POSIX threads standard.

2. The method of claim 1, further comprising obtaining said lock employing a lock structure, wherein said lock structure includes a lock.owner field representative of thread ownership of said lock.

3. The method of claim 2, wherein said lock structure further comprises a lock.status field representative of ownership of said lock structure, and wherein said determining comprises initially obtaining ownership of said lock structure by setting said lock.status before determining whether one thread or multiple threads desire said lock on said resource.

4. The method of claim 3, wherein said lock structure further includes a lock.waiter field representative of a number of threads waiting for said lock, and wherein said determining comprises evaluating said lock.waiters field and said lock.owner field to ascertain whether only said one thread actively desires said lock on said resource.

5. The method of claim 4, wherein said second lock process comprises incrementing said lock.waiters, releasing said lock.status, and implementing a queue of waiting threads when said determining determines that multiple threads concurrently desire ownership of said resource.

6. The method of claim 5, wherein said implementing said queue of waiting threads comprises employing a mutex function and a condition wait function of the POSIX threads standard.

7. The method of claim 6, further comprising allocating at initialization of a user of said multithread computer environment a "mutex" and a "cond" structure for use in implementing said mutex function and said wait condition function.

8. The method of claim 5, wherein said second lock process further comprises decrementing said control.waiters after obtaining said lock on said resource, said decrementing of said control.waiters being preceded by a compare and swap function to set said lock.status field.

9. The method of claim 1, wherein said second lock process employs said at least one function in the POSIX threads standard to implement a queue of threads waiting for said lock on said resource, said at least one function in the POSIX threads standard comprising a mutex function and a condition wait function.

10. The method of claim 1, wherein said computer environment comprises an AIX based multiprocessor system, and wherein said first lock process comprises an AIX kernel process.

11. The method of claim 1, wherein said resource comprises a threaded message passing interface (MPI) library.

12. The method of claim 1, wherein said first lock process comprises said operating system primitive lock process, and wherein said operating system primitive lock process comprises a single word compare and swap instruction.

13. The method of claim 12, wherein said computer environment comprises an AIX based multiprocessor system, and wherein said single word compare and swap instruction comprises a direct AIX kernel call.

14. A method for unlocking a lock on a resource in a multithread computer environment, said lock employing a lock structure including a lock.owner field representative of thread ownership of said resource, a lock.status field representative of ownership of said lock structure, and a lock.waiters field representative of a count of threads waiting to obtain said lock, said method comprising:

obtaining control of said lock structure by setting said lock.status field;

determining whether any threads are waiting for said lock by evaluating said lock.waiters field; and if no threads are waiting, directly setting said lock.owner field to null, otherwise employing at least one function in the POSIX threads standard to set said lock.owner field to null and issue a thread condition signal to waiting threads that said resource has been unlocked.

15. The method of claim 14, wherein said at least one function in the POSIX threads standard comprises a mutex function and a thread condition signal function, and wherein said mutex function employs a "mutex" structure and said thread condition signal employs a "cond" structure, said "mutex" structure and said "cond" structure being provided by a user of said multithread computer environment.

16. The method of claim 15, further comprising releasing said lock.status after setting said lock.owner to null.

17. The method of claim 14, wherein said multithread computer environment comprises an AIX based multiprocessor system.

* * * * *